(12) United States Patent
Hakuta et al.

(10) Patent No.: US 9,459,379 B2
(45) Date of Patent: Oct. 4, 2016

(54) OPTICAL MEMBER AND METHOD FOR PRODUCING SAME

(71) Applicant: FUJIFILM Corporation, Tokyo (JP)

(72) Inventors: Shinya Hakuta, Ashigarakami-gun (JP); Shinichiro Sonoda, Ashigarakami-gun (JP); Shigenori Yuuya, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 89 days.

(21) Appl. No.: 14/028,992

(22) Filed: Sep. 17, 2013

(65) Prior Publication Data

US 2014/0016204 A1  Jan. 16, 2014

Related U.S. Application Data

(63) Continuation of application No. PCT/JP2011/079017, filed on Dec. 15, 2011.

(30) Foreign Application Priority Data

Mar. 18, 2011  (JP) ................................. 2011-061404

(51) Int. Cl.
*G02B 27/00* (2006.01)
*G02B 1/11* (2015.01)
(Continued)

(52) U.S. Cl.
CPC ............ *G02B 1/11* (2013.01); *B29D 11/00009* (2013.01); *G02B 1/118* (2013.01); *G02B 1/12* (2013.01)

(58) Field of Classification Search
CPC ........ G02B 1/11; G02B 1/118; G02B 1/105; G02B 26/001; G02B 26/02; G02B 26/023; G02B 27/0018; G02B 1/10; G02B 1/111; G02B 5/0242; G02B 1/043; G02B 1/06; G02B 1/115; G02B 26/00; G02B 26/0833; G02B 5/02; G02B 5/0278; G02B 5/305
USPC .......... 359/601, 229, 290, 488.01, 580, 591; 351/44

See application file for complete search history.

(56) References Cited

U.S. PATENT DOCUMENTS

| | | | |
|---|---|---|---|
| 4,190,321 A | 2/1980 | Dorer et al. | |
| 2003/0087119 A1* | 5/2003 | Iwabuchi | ................ G06F 3/045 428/633 |

(Continued)

FOREIGN PATENT DOCUMENTS

| | | |
|---|---|---|
| CN | 1834693 A | 9/2006 |
| JP | 61-48124 B2 | 10/1986 |

(Continued)

OTHER PUBLICATIONS

Extended European Search Report dated Oct. 7, 2014, issued in corresponding European Patent Application No. 11861466.8.

(Continued)

*Primary Examiner* — Scott J Sugarman
*Assistant Examiner* — Sharrief Broome
(74) *Attorney, Agent, or Firm* — Birch, Stewart, Kolasch & Birch, LLP (57) ABSTRACT

Provided is an optical member, including: a substrate having an at least partially curved surface; a concave-convex structure at an outermost surface, the concave-convex structure being prepared by hydrothermal treatment of a layer formed by gas-phase deposition of at least one of simple aluminum and a compound containing aluminum on the substrate; and a dielectric layer formed by gas-phase deposition between the substrate and the concave-convex structure.

2 Claims, 4 Drawing Sheets

(51) Int. Cl.
*G02B 1/118* (2015.01)
*G02B 1/12* (2006.01)
*B29D 11/00* (2006.01)

(56) References Cited

U.S. PATENT DOCUMENTS

| | | |
|---|---|---|
| 2005/0233113 A1 | 10/2005 | Kotani et al. |
| 2006/0199040 A1 | 9/2006 | Yamada et al. |
| 2008/0192350 A1 | 8/2008 | Yamada et al. |

FOREIGN PATENT DOCUMENTS

| | | | |
|---|---|---|---|
| JP | 2006-259711 A | | 9/2006 |
| JP | 2006259711 A | * | 9/2006 |
| JP | CN 1834693 A | * | 9/2006 |
| JP | 2006-297681 A | | 11/2006 |
| JP | 2007-213780 A | | 8/2007 |
| JP | 4182236 B2 | | 11/2008 |
| JP | 2009-139775 A | | 6/2009 |
| JP | 2009-217049 A | | 9/2009 |

OTHER PUBLICATIONS

Japanese Office Action dated Feb. 4, 2014 issued in corresponding Japanese Patent Application No. 2011-061404.
International Search Report for PCT/JP2011/079017 dated Feb. 21, 2012.
Written Opinion of the International Searching Authority for PCT/JP2011/079017 dated Feb. 21, 2012.
Written Opinion of the International Searching Authority for PCT/JP2011/079017 dated Feb. 21, 2012. English Translation.
Japanese Office Action dated Oct. 7, 2014, issued in corresponding Japanese Patent Application No. 2011-061404.
Chinese Office Action dated Jul. 3, 2015, issued in corresponding Chinese Patent Application No. 201180069280.9 (English translation attached).
Chinese Office Action dated Dec. 3, 2014, issued in corresponding Chinese Patent Application No. 201180069260.9.
Chinese Office Action dated Dec. 30, 2015, issued in Chinese Patent Application No. 201180069260.9 (English translation attached).
Chinese Office Action dated Jun. 3, 2016, issued in corresponding Chinese Patent Application No. 201180069260.9 (English translation attached).

* cited by examiner

OPTICAL MEMBER AND METHOD FOR PRODUCING SAME

CROSS-REFERENCE TO RELATED APPLICATION

This application is a continuation application of International Application PCT/JP2011/079017 filed on Dec. 15, 2011, which claims priority under 35 U.S.C 119(a) to Application No. 2011-061404 filed in Japan on Mar. 18, 2011, all of which are hereby expressly incorporated by reference into the present application.

BACKGROUND OF THE INVENTION

1. Field of the Invention

The present invention relates to an optical member and a method for producing the optical member.

2. Description of the Related Art

There have been proposed a lot of films having a fine concave-convex surface and a great number of these films are suitable for use as antireflection materials. For example, there has been proposed an optical member including a substrate and an antireflection film which has fine concavity and convexity formed on and supported by a thin film layer formed on the substrate, the fine concavity and convexity being formed of a plate-like crystal made mainly from alumina and the thin film layer being composed of an oxide including at least one selected from zirconia, silica, titania, and zinc oxide (see Japanese Patent (JP-B) No. 4182236).

However, the disclosed optical member employs a liquid-phase film forming method (sol-gel method) as a method for forming the fine concavity and convexity, and such method is incompatible with a method for laminating the oxide thin film conventionally used for a lens. Moreover, the number of steps increases because a step of forming the thin film on the substrate is added. Furthermore, there are problems in that film adhesion and coating properties on a structure on which liquid readily collects, such as a concavity, are poor.

Moreover, Japanese Patent Application Publication (JP-B) No. 61-48124 discloses a technique of forming a fine concave-convex structure on a surface by vacuum vapor deposition of metal aluminum on a substrate and then subjecting the deposited metal aluminum to a hydrothermal treatment. However, Japanese Patent Application Publication (JP-B) No. 61-48124 does not disclose techniques of employing a lens having a curvature as the substrate and forming a dielectric layer between the substrate and the fine concave-convex structure.

Therefore, there have been demands for an optical member which has an antireflection effect on its entire surface or a certain part of its surface even when a substrate having an at least partially curved surface is used; and a method for producing the optical member, whereby a thickness of a film can be easily controlled, high film adhesion is achieved, a film can be easily formed on a structure which is incompatible with a liquid phase reaction such as a substrate having an at least partially curved surface, and at least one of aluminum and alumina can be deposited after forming a dielectric layer by gas-phase deposition without breaking vacuum.

SUMMARY OF THE INVENTION

An object of the present invention is to provide an optical member which has an antireflection effect on its entire surface or a certain part of its surface even when a substrate having an at least partially curved surface is used. Another object of the present invention is to provide a method for producing the optical member, whereby a thickness of a film can be easily controlled, high film adhesion is achieved, a film can be easily formed on a structure which is incompatible with a liquid phase reaction such as a substrate having an at least partially curved surface, and at least one of aluminum and alumina can be deposited after forming a dielectric layer by gas-phase deposition without breaking vacuum.

Solution to the problems described above is as follows. That is, the present invention provides an optical member including: a substrate having an at least partially curved surface; a concave-convex structure at an outermost surface, the concave-convex structure being prepared by hydrothermal treatment of a layer formed by gas-phase deposition of at least one of simple aluminum and a compound containing aluminum on the substrate; and a dielectric layer formed by gas-phase deposition between the substrate and the concave-convex structure.

According to the present invention, the problems seen in the conventional methods can be solved and it is possible to provide an optical member which has an antireflection effect on its entire surface or a certain part of its surface even when a substrate having an at least partially curved surface is used. Also, it is possible to provide a method for producing the optical member, whereby a thickness of a film can be easily controlled, high film adhesion is achieved, a film can be easily formed on a structure which is incompatible with a liquid phase reaction such as a substrate having an at least partially curved surface, and at least one of aluminum and alumina can be deposited after forming a dielectric layer by gas-phase deposition without breaking vacuum.

DETAILED DESCRIPTION OF THE INVENTION

Optical Member

An optical member of the present invention includes: a substrate having an at least partially curved surface; and a concave-convex structure at an outermost surface, the concave-convex structure being prepared by hydrothermal treatment of a layer formed by gas-phase deposition of at least one of simple aluminum and a compound containing aluminum on the substrate. The optical member of the present invention includes a dielectric layer, and as required, further includes another member.

<Substrate Having an at Least Partially Curved Surface>

The substrate having an at least partially curved surface has no particular limitations on its material, size, and structure, and can be arbitrarily selected depending on the purpose.

Examples of the substrate include a transparent glass substrate, a resin formed article, a synthetic resin sheet, a synthetic resin film, a ceramic plate, and a metal plate. Among these, the transparent glass substrate, the synthetic resin sheet, and the synthetic resin film are especially preferred.

Examples of a material of the transparent glass substrate include white plate glass, blue plate glass, green glass, and silica-coated blue plate glass. Also, glass having a high refractive index such as glass having fine particles dispersed therein, and light diffusing glass can be used.

Examples of a material of the resin formed article, the synthetic resin sheet, and the synthetic resin film include polyethylene terephthalate (PET), polycarbonates, polyethersulfones, polyesters, acrylic resins, vinyl chloride resins, aromatic polyamide resins, polyamideimides, polyimides, FRP (fiber-reinforced plastic), TAC (triacetyl cellulose), and cycloolefin polymers (manufactured by ZEON CORPORATION, product name ZEONOR and product name ZEONEX).

The size and structure of the substrate having an at least partially curved surface are not particularly limited, and can be arbitrarily selected depending on the use.

The curved surface may be present in at least a part of the substrate, and the substrate may be one having a two-dimensional or three-dimensional curved surface as a whole.

As the substrate having an at least partially curved surface, a lens having a curvature is preferred. Examples of such lens include concave meniscus lenses, concave lenses, convex lenses, aspherical lenses, and cylindrical lenses. As the substrate having an at least partially curved surface, a structure having a large curvature, that is, an optical member on which light having a large incident angle also falls, such as an optical member arranged obliquely to incident light (for example, prism), enjoys a greater benefit of the antireflection effect of the fine concave-convex structure.

<A Layer Formed by Gas-Phase Deposition of at Least One of Simple Aluminum and a Compound Containing Aluminum>

Examples of the compound containing aluminum include aluminum oxides and aluminum oxides with oxygen defect.

The method of gas-phase deposition of at least one of simple aluminum and the compound containing aluminum is not particularly limited, and can be arbitrarily selected from known methods depending on the purpose. An example of the method is a vacuum vapor deposition method, and there are two major types of the method: chemical vapor deposition method and physical vapor deposition method. Examples of the chemical vapor deposition method include plasma CVD method, laser CVD method, thermal CVD method, and gas-source CVD method. Examples of the physical vapor deposition method include sputtering method, electron-beam vapor deposition method, resistance heating vapor deposition method, and molecular beam epitaxy method. Among these, electron-beam vapor deposition method is especially preferred.

Gas-phase deposition under atmospheric pressure such as chemical vapor deposition method under atmospheric pressure can be also employed.

The gas-phase deposition is highly compatible with a gas-phase deposition method for a dielectric layer which has been conventionally used for antireflection of a lens, and has benefits of providing satisfactory film thickness controllability and satisfactory film adhesion, and easily forming a film even on a substrate having a complex shape such as a concave surface.

The average thickness of an outermost layer composed of aluminum formed by gas-phase deposition is preferably 100 nm or less, more preferably 1 nm to 80 nm. When the average thickness exceeds 100 nm, a boehmite layer (about 200 nm or more) which does not become the fine concave-convex structure and remains as a dense layer thickly arises under the fine concave-convex structure. The boehmite layer causes strong optical interference and then has an adverse effect on broadband antireflection of entire visible light. Moreover, when the average thickness of the outermost layer composed of aluminum exceeds 100 nm, the time required for the hydrothermal treatment becomes long (in the case of using boiling water, the time is about 10 minutes or more), that is, the treatment takes a longer time, and then, the substrate and the like may be affected by the hydrothermal treatment.

The average thickness of an outermost layer composed of alumina formed by gas-phase deposition is preferably 150 nm or less, more preferably 2 nm to 120 nm. When the average thickness exceeds 150 nm, a boehmite layer (thickness of about 200 nm or more) which does not become the fine concave-convex structure and remains as a dense layer thickly arises under the fine concave-convex structure, as in the case of aluminum. The boehmite layer causes strong optical interference and then has an adverse effect on broadband antireflection of entire visible light. Moreover, when the average thickness of the outermost layer composed of alumina exceeds 150 nm, the time required for the hydrothermal treatment becomes long (in the case of using boiling water, the time is about 10 minutes or more), that is, the treatment takes a longer time, and then, the substrate and the like may be affected by the hydrothermal treatment.

<Concave-Convex Structure>

The concave-convex structure is formed by the hydrothermal treatment of the outermost layer obtained by gas-phase deposition of at least one of aluminum and alumina on the substrate. As mentioned above, the outermost layer is composed of the concave-convex structure and the dense layer.

—Hydrothermal Treatment—

There are no particular limitations on the hydrothermal treatment, and the hydrothermal treatment can be arbitrarily selected depending on the purpose. Examples of the hydrothermal treatment include (1) a method of immersing into hot water having a temperature of 60° C. or more but a boiling point thereof or less (including boiling water), (2) a method of immersing into an alkaline aqueous solution having a temperature of 60° C. or more but a boiling point thereof or less, and (3) a method of exposing to water vapor.

By subjecting the outermost layer formed by gas-phase deposition of at least one of aluminum and alumina on the substrate to the hydrothermal treatment, the outermost layer is peptized and then transformed to boehmite (aluminum hydroxide, $Al_2O_3(H_2O)$) in both cases of aluminum and alumina. The boehmite layer has a character of being dissolved in water or aqueous solution in an extremely small amount, and when the boehmite layer is dissolved, force of pulling the boehmite layer by water acts (cavitation effect). The force arises on the whole of the outermost layer with some uniformity, and therefore, the fine concave-convex structure is formed over all with an average pitch of about 100 nm.

In (1) a method of immersing into hot water having a temperature of 60° C. or more but a boiling point thereof or less, the temperature of the hot water is preferably 80° C. to 100° C. The immersion time in the hot water varies depending on the thickness of the formed layer composed of aluminum and alumina, but is about 1 second to 30 minutes, most preferably about 10 seconds to 10 minutes. When immersion is carried out for 30 minutes or more, the height of a convex portion of the fine concave-convex structure may be decreased due to dissolution. Moreover, continuing immersion in boiling water after finishing the formation of the fine concave-convex structure may have an adverse effect on other constituents: the substrate and the dielectric layer. Hence, the immersion time is preferably short.

Examples of an alkali of the alkaline aqueous solution at 60° C. or more and a boiling point thereof or less in method (2) include sodium hydroxide, potassium hydroxide, amine solutions such as triethanolamine, and ammonia. Among these, the amine solution is preferably used, and triethanolamine is especially preferred because of having action of suppressing re-precipitation of dissolved aluminum on the glass substrate by a chelate reaction. The temperature of the alkaline aqueous solution is preferably 60° C. to 100° C. The immersion time in the alkaline aqueous solution is about 1 second to about 30 minutes, most preferably about 10 seconds to about 10 minutes.

As the hydrothermal treatment of (3), treatment of exposing to water vapor is preferred. The time of the treatment of exposing to water vapor is about 1 minute to about 24 hours.

The average height of the convex portion of the concave-convex structure is preferably 5 nm to 1,000 nm, more preferably 20 nm to 500 nm. When the average height of the convex portion is less than 5 nm, the concave-convex structure is too thin for visible light, and hence, a phenomenon of a refractive index changing gradually due to the fine concavity-convexity may not occur. When the average height of the convex portion exceeds 1,000 nm, an aspect ratio to the pitch becomes too large, which may result in poor mechanical strength and poor resistance to stain.

The average height of the convex portion of the concave-convex structure can be measured by, for example, a SEM image of a cross-sectional structure. Specifically, SEM observation of a sample was carried out by sputtering a surface with a metal (gold, palladium, or the like) extremely thinly in a nanometer order to allow the surface to be conductive because boehmite itself was insulating. At this time, first, the metal sputtering is performed and then the sample is broken with the substrate in order to expose a cross section, so that the metal adheres only to the portion originally exposing outside and does not adhere to the cross section.

Figure 3:
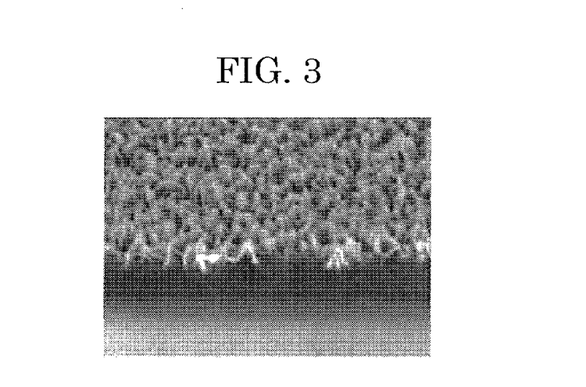
FIG. 3 is a cross-sectional SEM photograph of the optical member of Example 1.

The concave-convex structure including tops and bottoms is sputtered with the metal because it is exposed outside, and a portion present inside as the dense layer is not sputtered with the metal. Therefore, the thickness of the concave-convex structure (height of the convex portion) was calculated by measuring the distance between the top and the bottom in the metal-sputtered portion, and the thickness of the dense layer was calculated by measuring the distance between the bottom and a glass interface. FIG. 3 is a SEM image of a cross section of a sample (optical member) produced by this method.

Alternative method of calculating the thickness of the concave-convex structure is a method of observing the surface with AFM. At this time, there is a need to pay attention to an error caused by a thickness of a needle or the like of AFM especially in the bottom because the pitch of the surface is significantly small.

<Dielectric Layer>

The dielectric layer is a layer formed by gas-phase deposition between the substrate and the concave-convex structure.

The dielectric layer is formed by gas-phase deposition on the substrate, and has no particular limitations on the refractive index and material. For example, the dielectric layer can be used for improving the antireflection effect by selecting a refractive index intermediate between that of the substrate and that of the concave-convex structure, or for mitigating an impact on the substrate or the like in the hydrothermal treatment by forming an dielectric layer which is made of $SiO_2$ or the like and then less pervious to water.

The method of forming the dielectric layer is not particularly limited, and can be arbitrarily selected depending on the purpose. Examples of the method of forming the dielectric layer include physical vapor deposition (PVD) methods such as vacuum vapor deposition methods (electron beam vapor deposition method, resistance heating vapor deposition method), sputtering method, ion plating method, ion beam method, ion assisted method, and laser ablation method; and chemical vapor deposition (CVD) methods such as thermal CVD method, photo CVD method, and plasma CVD method. Among these, physical vapor deposition (PVD) methods are preferred, and sputtering method and vacuum vapor deposition method are especially preferred because these methods have been conventionally commonly used for an antireflection structure including a dielectric layer.

It is preferred that the dielectric layer is a multiple layer composed of two or more layers because such multiple layer has more reflecting surfaces than a single layer and therefore optical interference can be easily controlled, resulting in high availability for antireflection applications for substrates having various optical properties (including refractive index), and because it is possible to expand the range of the dielectric layer selection by allocating moisture resistance and an optimum refractive index to different layers.

—Dielectric Multiple Layer—

The dielectric multiple layer is formed on the substrate by laminating a plurality of dielectric layers having different refractive indexes. It is preferred to alternately laminate a plurality of dielectric layers having a high refractive index and a plurality of dielectric layers having a low refractive index, but the number of kinds of layers is not limited to 2 or more and may be more than that.

The number of laminated layers is preferably 2 to 20, more preferably 2 to 12, still more preferably 4 to 10, especially preferably 6 to 8. When the number of laminated layers exceeds 20, production efficiency becomes low due to multi-layer deposition and the object and the effect of the present invention may be achieved in a lower level.

The lamination order of the dielectric layers is not particularly limited and can be arbitrarily selected depending on the purpose. For example, for the purpose of further improving antireflection performance, when an adjacent layer has a high refractive index, a layer having a lower refractive index than that of the adjacent layer is laminated first. On the contrary, when an adjacent layer has a low refractive index, a layer having a higher refractive index than that of the adjacent layer is laminated first. An indication of determining whether the refractive index is high or low is a refractive index of about 1.8, and a material having a lower refractive index than about 1.8 and a material having a higher refractive index than about 1.8 are often used. It is noted that the indication of determining whether the refractive index is high or low is not an absolute. The materials having high refractive indexes may include one having a relatively high refractive index and one having a relatively low refractive index and these materials may be used alternately.

Examples of the material of the dielectric layer having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, SiO, $Ta_2O_5$, $TiO_2$, TlCl, $Y_2O_3$, ZnSe, ZnS, and $ZrO_2$. Among these, $Bi_2O_3$, $CeO_2$, $CeF_3$, $HfO_2$, SiO, $Ta_2O_5$, $TiO_2$, $Y_2O_3$, ZnSe, ZnS, and $ZrO_2$ are preferred, and SiO, $Ta_2O_5$, $TiO_2$, $Y_2O_3$, ZnSe, ZnS, and $ZrO_2$ are especially preferred.

Examples of the material of the dielectric layer having a low refractive index include $Al_2O_3$, $BiF_3$, $CaF_2$, $LaF_3$, $PbCl_2$, $PbF_2$, LiF, $MgF_2$, MgO, $NdF_3$, $SiO_2$, $Si_2O_3$, NaF, $ThO_2$, and $ThF_4$. Among these, $Al_2O_3$, $BiF_3$, $CaF_2$, $MgF_2$, MgO, $SiO_2$, and $Si_2O_3$ are preferred, and $Al_2O_3$, $CaF_2$, $MgF_2$, MgO, $SiO_2$, and $Si_2O_3$ are especially preferred.

It is noted that the material of the dielectric layer has no particular limitations on its atomic ratio and can be arbitrarily selected depending on the purpose. The atomic ratio can be controlled by changing a concentration of atmosphere gas during formation of the layer.

Moreover, it is possible to use a target material prepared by a compound containing a plurality of elements (for example, $SiO_2$—$TiO_2$).

The method of forming the dielectric multiple layer is not particularly limited and can be arbitrarily selected depending on the purpose. Examples of the method include physical vapor deposition (PVD) methods such as vacuum vapor deposition method (electron beam vapor deposition method, resistance heating vapor deposition method), sputtering method, ion plating method, ion beam method, ion assisted method, and laser ablation method; and chemical vapor deposition (CVD) methods such as thermal CVD method, photo CVD method, and plasma CVD method. Among these, physical vapor deposition (PVD) methods are preferred, and sputtering method and vacuum vapor deposition method are especially preferred because these methods have been conventionally commonly used for an antireflection structure including a dielectric multiple layer.

As sputtering method, DC sputtering method is preferred because of a high deposition rate. Note that it is preferred to use a highly-conductive material in DC sputtering method. As a method of forming the multiple layer by sputtering method, there are given the following methods: (1) one chamber method of forming the layers alternately or in order in one chamber using a plurality of targets and (2) a multi-chamber method of forming the layers continuously using a plurality of chambers. Among these, the multi-chamber method is especially preferred in view of productivity and suppressing material contamination.

Vacuum vapor deposition methods includes thermal resistance heating method and electron beam vapor deposition method, and electron beam vapor deposition method is especially preferred because even an oxide having a high melting point can be easily ejected.

In view of antireflection, the thickness of the dielectric layer is preferably $\lambda/16$ to $\lambda$, more preferably $\lambda/8$ to $3\lambda/4$, still more preferably $\lambda/6$ to $3\lambda/8$ when an optical wavelength is represented by $\lambda$.

(Method for Producing Optical Member)

The method for producing the optical member of the present invention includes a dielectric layer formation step, an outermost layer formation step, and a hydrothermal treatment step, and as required, further includes another step.

<Dielectric Layer Formation Step>

The dielectric layer formation step is a step of forming the dielectric layer on the substrate having an at least partially curved surface by gas-phase deposition.

Examples of the gas-phase deposition include vacuum vapor deposition methods, and chemical vapor deposition methods and physical vapor deposition methods. Examples of chemical vapor deposition methods include plasma CVD method, laser CVD method, thermal CVD method, and gas source CVD method. Examples of physical vapor deposition methods include sputtering method, resistance heating vapor deposition method, electron beam vapor deposition method, and molecular beam epitaxy method. Among these, electron beam vapor deposition method is especially preferred because (1) the running cost is relatively low in comparison with that of the molecular beam epitaxy method or the like, (2) unlike resistance heating vapor deposition method, even a material having a high melting point such as an oxide can be easily ejected, (3) a larger number of materials can be ejected in one film formation process in comparison with the sputtering method or the like, (4) the materials can be easily changed, and (5) this method is commonly used for applying the dielectric layer in the conventional antireflection techniques.

The conditions of electron beam vapor deposition method varies depending on the material, hearth, and apparatus and can not be completely defined, but it is preferred to carry out deposition with vacuuming to a vacuum degree of about $3 \times 10^{-6}$ Torr or less and heating the substrate at about 150° C. because higher film adhesion can be achieved.

<Outermost Layer Formation Step>

The outermost layer formation step is a step of forming the outermost layer on the dielectric layer by gas-phase deposition of at least one of simple aluminum and a compound containing aluminum.

As a method of the gas-phase deposition, the same methods as those described in the dielectric layer formation step can be used.

<Hydrothermal Treatment Step>

The hydrothermal treatment step is a step of subjecting the outermost layer formed by gas-phase deposition to the hydrothermal treatment to form the concave-convex structure.

As mentioned above, examples of the hydrothermal treatment include (1) a method of immersing into hot water having a temperature of 60° C. or more but a boiling point thereof or less, (2) a method of immersing into alkaline aqueous solution having a temperature of 60° C. or more but a boiling point thereof or less, and (3) a method of exposing to water vapor.

In the present invention, it is preferred to carry out gas-phase deposition in the dielectric layer formation step and gas-phase deposition in the outermost layer formation step continuously with maintaining a vacuum state, because (1) the frequency and the time of vacuuming, which making up the majority of a takt time of a film formation method using vacuum, can be reduced in comparison with the case of vacuuming each time, which results in higher productivity, (2) forming a layer of aluminum and alumina by gas-phase deposition on an outermost layer of the dielectric layer with maintaining the vacuum state prevents stain such as an organic substance or water from occurring on the outermost layer of the dielectric layer, whereby higher film adhesion between aluminum and alumina, and the dielectric layer can be achieved, and (3) cracks due to stain is hardly occur in the outermost layer composed of aluminum and alumina by the same reason as that in (2) above.

The other step is not particularly limited and can be arbitrarily selected depending on the purpose. An example is a step of forming a mask in a non-deposited portion.

The optical member of the present invention can be widely used in glass spectacles, optical lenses, solar battery panels, cathode-ray tubes, filters, word processors, computers, televisions, displays such as plasma display panel, polarization plates used for a liquid crystal display device, finder lenses for cameras, prisms, fly-eye lenses, toric lenses, covers for various measuring gauges, or windows of automobiles or trains.

EXAMPLES

A description will now be given of Examples of the present invention, but it should be construed that the invention is in no way limited to those Examples.

<Measurement Method of Transmission Spectrum and Reflection Spectrum>

Transmittances and reflectances were measured for light ranging from 350 nm to 800 nm at incident angles of 5 degrees, 12 degrees, 30 degrees, and 45 degrees by using a spectrophotometer (manufactured by Hitachi, Ltd., U-4000) and transmission spectra and reflection spectra were obtained. The measurement was carried out for light controlled to be un-polarized light by using a polarizer.

<Measurement Method of Refractive Index Distribution>

Refractive index distribution was measured by spectroscopic ellipsometry (manufactured by J. A. Woollam Co., Inc., VASE).

<Observation of Optical Member Structure>

The structure of an optical member was observed by using a field-emission-type scanning electron microscope (FE-SEM, manufactured by Hitachi, Ltd., S-4300).

Also, the structure of a cross section of an optical member was observed by using a cross-sectional SEM (FE-SEM, manufactured by Hitachi, Ltd., S-4300).

Example 1

Production of Optical Member

Figure 1:
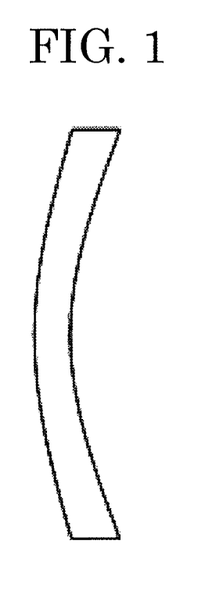
FIG. 1 is a schematic view illustrating a concave meniscus lens used in Example 1.

As a substrate, a concave meniscus lens (material S-TIH6, manufactured by OHARA INC.) shown in FIG. 1 was used. The concave meniscus lens employed a glass having a refractive index for d-line of 1.805.

The concave meniscus lens was subjected to ultrasonic cleaning using pure water (45 kHz, for 3 minutes), and then, dried by a spin dryer and baking at 150° C.

Next, the concave meniscus lens was placed at an EB deposition apparatus (manufactured by ULVAC, Inc., EBX-8) so that deposition was conducted on the concave surface of the lens. Vacuuming was carried out up to a vacuum degree of $2.0 \times 10^{-6}$ Torr.

Next, aluminum oxide was deposited by electron beam vapor deposition using a crystal oscillator as a guide so that the thickness was 58 nm.

Next, metal aluminum was deposited thereon so that the thickness was 5 nm.

Next, the concave meniscus lens was placed at the EB deposition apparatus (manufactured by ULVAC, Inc., EBX-8) so that deposition was conducted on the convex surface of the lens, and then, deposition of aluminum oxide was conducted so that the thickness was 58 nm and deposition of aluminum was conducted so that the thickness was 5 nm by the same manner.

By operations mentioned above, a concave meniscus lens having aluminum oxide deposited thereon and having aluminum deposited on aluminum oxide on the both surfaces was obtained.

Next, a stainless vat containing pure water was prepared on a hot plate and the water was heated to boiling.

The concave meniscus lens having aluminum oxide deposited thereon and having aluminum deposited on aluminum oxide on the both surfaces was put into the boiling water. It was confirmed that aluminum luster became transparent in about 10 seconds.

The lens was taken out after immersed in the boiling water for 20 seconds, and then, dried by a spin dryer and baking at 100° C. after removing moisture by $N_2$ blow.

By the operations mentioned above, a concave meniscus lens having an antireflection function was produced as an optical member of Example 1.

Figure 2:
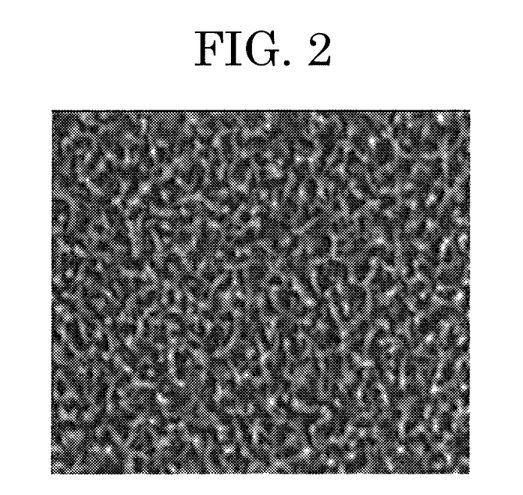
FIG. 2 is a FE-SEM photograph of an optical member of Example 1.

FE-SEM observation of the obtained optical member revealed that a fine concave-convex structure composed mainly of aluminum oxide and its hydrate shown in FIG. 2 was formed. Moreover, a cross-sectional SEM shows a structure shown in FIG. 3, which indicated that the thickness of a deposited layer of aluminum oxide (dielectric layer) was maintained at 58 nm, a dense layer having a thickness of 44 nm was formed on the dielectric layer, and a concave-convex structure including a convex portion having an average height of 100 nm was formed on the dense layer. The height of the convex portion and the thickness of the dense layer were measured as follows.

<Measurement of Height of Convex Portion and Thickness of Dense Layer>

The height of the convex portion in the concave-convex structure and the thickness of the dense layer were measured by using a cross-sectional SEM image. Specifically, SEM observation of a sample was carried out by sputtering a surface with a metal (gold, palladium, or the like) extremely thinly in a nanometer order to allow the surface to be conductive because boehmite itself was insulating. At this time, first, the metal sputtering was performed and then the sample was broken with the substrate in order to expose a cross section, so that the metal adheres only to the portion originally exposing outside and does not adhere to the cross section.

The concave-convex structure including tops and bottoms was sputtered with the metal because it was exposed outside, and the portion present inside as the dense layer was not sputtered with the metal. Therefore, the thickness of the concave-convex structure (height of the convex portion) was calculated by measuring the distance between the top and the bottom in the metal-sputtered portion, and the thickness of the dense layer was calculated by measuring the distance between the bottom and a glass interface.

Figure 4:
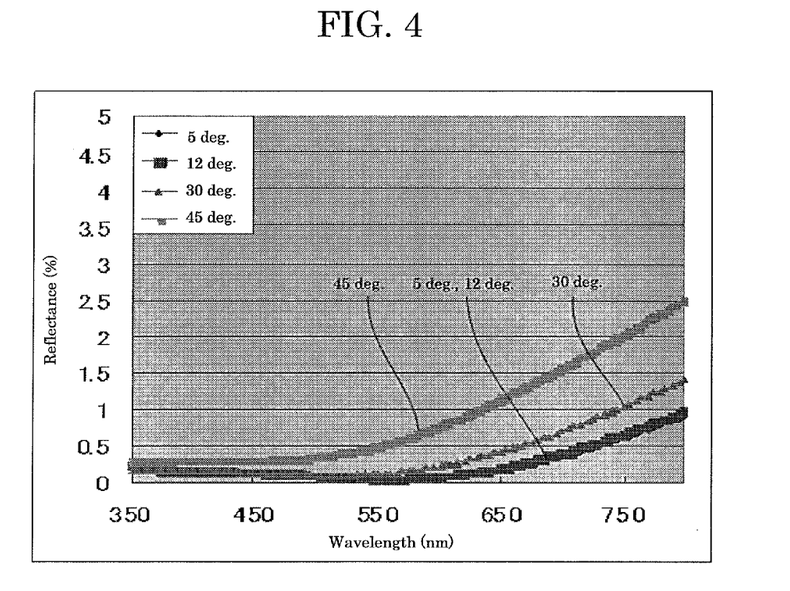
FIG. 4 is a graph showing reflectances of the optical member of Example 1 at incidence angles of 5 degrees, 12 degrees, 30 degrees, and 45 degrees.

FIG. 4 shows spectral reflectances of the obtained optical member. The measurement was performed on the reflectances on front and back surfaces. FIG. 4 shows reflectances at incident angles of 5 degrees, 12 degrees, 30 degrees, and 45 degrees. Further, Table 1 shows average reflectances for light ranging from 380 nm to 780 nm at incident angles of 5 degrees, 12 degrees, 30 degrees, and 45 degrees.

TABLE 1

| Incident angle | Visible light average reflectance (%) |
|---|---|
| 5 degrees | 0.23 |
| 12 degrees | 0.24 |
| 30 degrees | 0.39 |
| 45 degrees | 0.93 |

FIG. 4 and Table 1 revealed that the average reflectances at incident angles of 5 degrees and 45 degrees were 0.58%, which indicated that the antireflection effect could be widely exerted on incident light coming from front to oblique directions.

Example 2

An optical member of Example 2 was produced by the same procedure as that in Example 1 except that $SiO_2$ was deposited so that the thickness was 53 nm instead of depositing aluminum oxide so that the thickness was 58 nm in Example 1.

Figure 5:
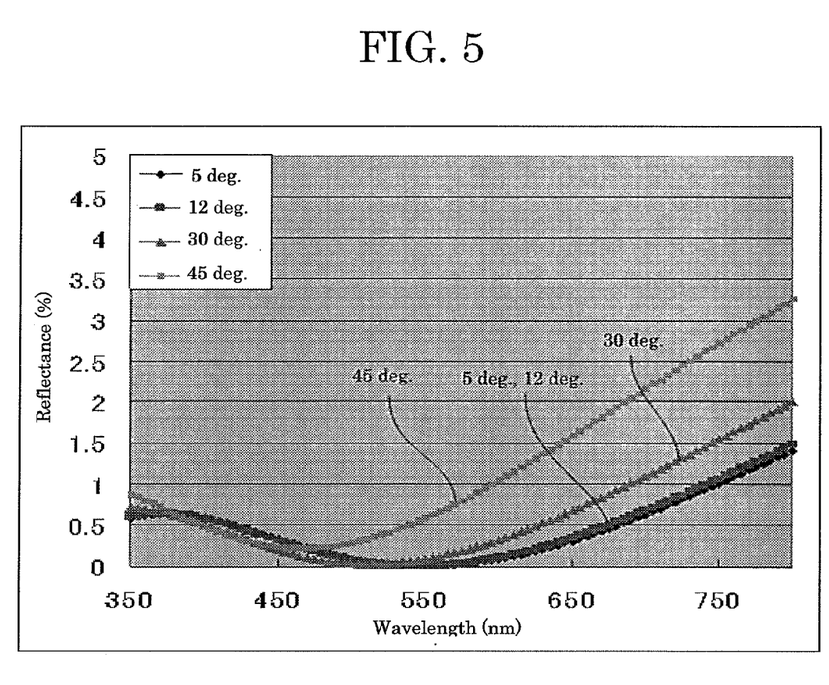
FIG. 5 is a graph showing reflectances of an optical member of Example 2 at incidence angles of 5 degrees, 12 degrees, 30 degrees, and 45 degrees.

FIG. 5 shows spectral reflectances of the obtained optical member. Measurement was performed for the reflectances on front and back surfaces. FIG. 5 shows reflectances at incident angles of 5 degrees, 12 degrees, 30 degrees, and 45 degrees. Further, Table 2 shows average reflectances for light ranging from 380 nm to 780 nm at incident angles of 5 degrees, 12 degrees, 30 degrees, and 45 degrees.

TABLE 2

| Incident angle | Visible light average reflectance (%) |
| --- | --- |
| 5 degrees | 0.40 |
| 12 degrees | 0.42 |
| 30 degrees | 0.59 |
| 45 degrees | 1.19 |

FIG. 5 and Table 2 revealed that the average reflectances at incident angles of 5 degrees and 45 degrees were 0.80%, which indicated that the antireflection effect could be widely exerted on incident light coming from front to oblique directions.

Example 3

An optical member of Example 3 was produced by the same procedure as that in Example 2 except that the time of the hydrothermal treatment using boiling water was changed to 60 minutes from 20 seconds. At this time, prolonged hydrothermal treatment using boiling water allowed alumina in the convex portion in the outermost concave-convex structure to be dissolved out gradually, and the average height of the convex portion was reduced to 50 nm. Table 3 shows relation between the incident angle and the reflectance.

TABLE 3

| Incident angle | Visible light average reflectance (%) |
| --- | --- |
| 5 degrees | 0.90 |
| 12 degrees | 0.93 |
| 30 degrees | 1.25 |
| 45 degrees | 2.56 |

Table 3 revealed that Example 3 had a sufficiently higher antireflection effect in comparison with that of Comparative Example 1, but has a slightly lower antireflection property in comparison with that of Example 2 due to reduced average height of the convex portion.

Example 4

An optical member of Example 4 was produced by the same procedure as that in Example 2 except that the hydrothermal treatment was carried out by immersion into boiling water for 5 minutes instead of immersion into boiling water for 20 seconds in Example 2. The optical member of Example 4 had performance equivalent to that of Example 2.

Example 5

An optical member of Example 5 was produced by the same procedure as that in Example 4 except that $SiO_2$ was deposited so that the thickness was 30 nm, aluminum was deposited so that the thickness was 10 nm, and the hydrothermal treatment was carried out in boiling water for 5 minutes.

Table 4 shows average reflectances of the obtained optical member for light ranging from 380 nm to 780 nm at incident angles of 5 degrees, 12 degrees, 30 degrees, and 45 degrees.

TABLE 4

| Incident angle | Visible light average reflectance (%) |
| --- | --- |
| 5 degrees | 0.41 |
| 12 degrees | 0.42 |
| 30 degrees | 0.60 |
| 45 degrees | 1.18 |

Table 4 revealed that the average reflectances at incident angles of 5 degrees and 45 degrees were 0.80%, which indicated that the antireflection effect could be widely exerted on incident light coming from front to oblique directions.

Example 6

An optical member of Example 6 was produced by the same procedure as that in Example 2 except that the hydrothermal treatment was carried out by immersion into water having a temperature of 121° C. at 2 atmospheres for 20 seconds by using an autoclave instead of immersion into boiling water for 20 seconds in Example 2.

Example 7

An optical member of Example 7 was produced by the same procedure as that in Example 2 except that the hydrothermal treatment was carried out by treatment using heated water vapor of 100° C. for 30 minutes instead of immersion into boiling water for 20 seconds in Example 2.

Example 8

An optical member of Example 8 was produced by the same procedure as that in Example 2 except that the hydrothermal treatment was carried out by immersion into an alkaline aqueous solution (0.5% by mass triethanolamine) of 100° C. for 5 minutes instead of immersion into boiling water for 20 seconds in Example 2.

Table 5 shows average reflectances of the obtained optical member for light ranging from 380 nm to 780 nm at incident angles of 5 degrees, 12 degrees, 30 degrees, and 45 degrees.

TABLE 5

| Incident angle | Visible light average reflectance (%) |
| --- | --- |
| 5 degrees | 0.39 |
| 12 degrees | 0.40 |
| 30 degrees | 0.57 |
| 45 degrees | 1.14 |

Table 5 revealed that the average reflectances at incident angles of 5 degrees and 45 degrees were 0.80%, which indicated that the antireflection effect could be widely exerted on incident light coming from front to oblique directions.

Example 9

An optical member of Example 9 was produced by the same procedure as that in Example 2 except that the hydrothermal treatment using boiling water was carried out for 10 minutes and aluminum was deposited so that the thickness was 120 nm instead of depositing aluminum so that the thickness was 5 nm in Example 2.

Table 6 shows average reflectances of the obtained optical member for light ranging from 380 nm to 780 nm at incident angles of 5 degrees, 12 degrees, 30 degrees, and 45 degrees.

TABLE 6

| Incident angle | Visible light average reflectance (%) |
| --- | --- |
| 5 degrees | 0.90 |
| 12 degrees | 0.93 |
| 30 degrees | 1.50 |
| 45 degrees | 3.12 |

Table 6 revealed that the optical member of Example 9 had a sufficiently higher antireflection effect in comparison with that of Comparative Example 1, but has a slightly lower antireflection property in comparison with that of Example 2.

Example 10

An optical member of Example 10 was produced by the same procedure as that in Example 2 except that the hydrothermal treatment using boiling water was carried out for 10 minutes and aluminum oxide was deposited so that the thickness was 160 nm instead of depositing aluminum so that the thickness was 5 nm in Example 2.

Table 7 shows average reflectances of the obtained optical member for light ranging from 380 nm to 780 nm at incident angles of 5 degrees, 12 degrees, 30 degrees, and 45 degrees.

TABLE 7

| Incident angle | Visible light average reflectance (%) |
| --- | --- |
| 5 degrees | 1.00 |
| 12 degrees | 1.05 |
| 30 degrees | 1.61 |
| 45 degrees | 3.40 |

Table 7 revealed that the optical member of Example 10 had a sufficiently higher antireflection effect in comparison with that of Comparative Example 1, but has a slightly lower antireflection property in comparison with that of Example 2.

Example 11

An optical member of Example 11 was produced by the same procedure as that in Example 2 except that a plastic concave meniscus lens (ZEONEX 480 R, refractive index 1.525) was used as a substrate, $SiO_2$ was deposited so that the thickness was 30 nm, aluminum was deposited so that the thickness was 10 nm, and the hydrothermal treatment was carried out in water of 60° C. for 5 minutes. It is believed that, in Example 11, the hydrothermal treatment has a smaller impact on the plastic substrate because a silica layer is formed in comparison with the case of boehmite alone.

Table 8 shows average reflectances of the obtained optical member for light ranging from 380 nm to 780 nm at incident angles of 5 degrees, 12 degrees, 30 degrees, and 45 degrees.

TABLE 8

| Incident angle | Visible light average reflectance (%) |
| --- | --- |
| 5 degrees | 0.40 |
| 12 degrees | 0.41 |
| 30 degrees | 0.92 |
| 45 degrees | 1.60 |

Table 8 revealed that the average reflectances at incident angles of 5 degrees and 45 degrees were 1.0%, which indicated that the antireflection effect could be widely exerted on incident light coming from front to oblique directions.

Example 12

A concave meniscus lens was placed at an EB deposition apparatus (manufactured by ULVAC, Inc., EBX-8) so that deposition was conducted on the concave surface of the lens. Vacuuming was carried out up to a vacuum degree of $2.0 \times 10^{-6}$ Torr with heating at 200° C.

First, $SiO_2$ was deposited thereon so that the thickness was 24 nm by electron beam vapor deposition using a crystal oscillator as a guide. Next, the target was changed and $TiO_2$ was deposited so that the thickness was 16 nm by electron beam vapor deposition using a crystal oscillator as a guide.

Further, metal aluminum was deposited so that the thickness was 5 nm. After that, an optical member of Example 12 was produced by the same procedure as that in Example 1.

Figure 6:
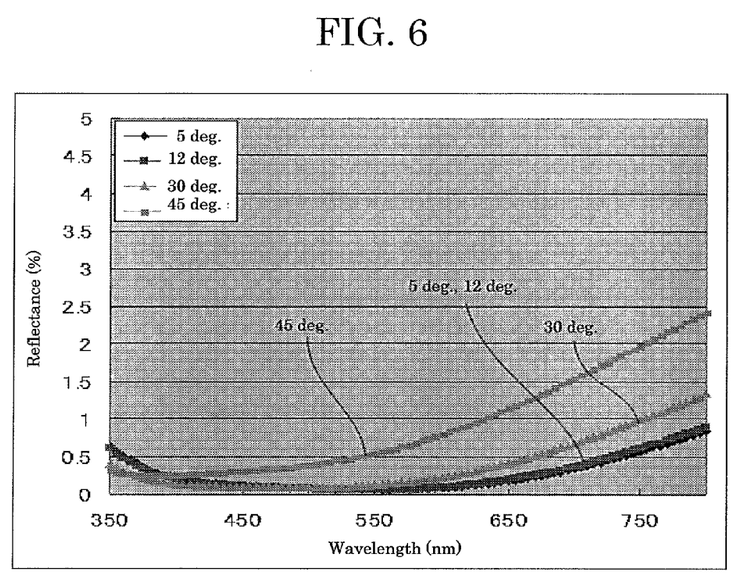
FIG. 6 is a graph showing reflectances of an optical member of Example 12 at incidence angles of 5 degrees, 12 degrees, 30 degrees, and 45 degrees.

FIG. 6 shows spectral reflectances of the obtained optical member. Measurement was performed for the reflectances on front and back surfaces. FIG. 6 shows reflectances at incident angles of 5 degrees, 12 degrees, 30 degrees, and 45 degrees. Further, Table 9 shows average reflectances for light ranging from 380 nm to 780 nm at incident angles of 5 degrees, 12 degrees, 30 degrees, and 45 degrees.

TABLE 9

| Incident angle | Visible light average reflectance (%) |
| --- | --- |
| 5 degrees | 0.21 |
| 12 degrees | 0.22 |
| 30 degrees | 0.36 |
| 45 degrees | 0.90 |

FIG. 6 and Table 9 revealed that the average reflectances at incident angles of 5 degrees and 45 degrees were 0.56%, which indicated that the antireflection effect could be widely exerted on incident light coming from front to oblique directions.

Example 13

Production of Optical Member

An optical member of Example 13 was produced by the same procedure as that in Example 12 except that a concave lens (material S-TIH6, manufactured by OHARA INC.) was used as the substrate instead of using the concave meniscus lens in Example 12.

Example 14

Production of Optical Member

An optical member of Example 14 was produced by the same procedure as that in Example 12 except that a convex lens (material S-TIH6, manufactured by OHARA INC.) was used as the substrate instead of using the concave meniscus lens in Example 12.

Example 15

Production of Optical Member

An optical member of Example 15 was produced by the same procedure as that in Example 2 except that the second layer, which was the outermost layer, was formed of $Al_2O_3$ instead of Al in Example 2.

Example 16

Production of Optical Member

An optical member of Example 16 was produced by the same procedure as that in Example 12 except that the third layer, which was the outermost layer, was formed of $Al_2O_3$ instead of Al in Example 12.

Example 17

Production of Optical Member

An optical member of Example 17 was produced by the same procedure as that in Example 12 except that the first layer was formed of $Al_2O_3$ so that the thickness was 60 nm, the second layer was formed of $SiO_2$ so that the thickness was 3 nm, the thickness of the outermost aluminum layer was 15 nm, and the time of the hydrothermal treatment was changed from 20 seconds to 1 minute. Table 10 shows average reflectances for light ranging from 380 nm to 780 nm at incident angles of 5 degrees, 12 degrees, 30 degrees, and 45 degrees.

TABLE 10

| Incident angle | Visible light average reflectance (%) |
|---|---|
| 5 degrees | 0.22 |
| 12 degrees | 0.20 |
| 30 degrees | 0.16 |
| 45 degrees | 0.34 |

Table 10 revealed that the average reflectances at incident angles of 5 degrees and 45 degrees were 0.31%, which indicated that the antireflection effect could be widely exerted on incident light coming from front to oblique directions.

Example 18

Production of Optical Member

An optical member of Example 18 was produced by the same procedure as that in Example 17 except that the hydrothermal treatment was carried out for 5 minutes instead of 1 minute in Example 17.

The obtained optical member included aluminum oxide as a lower layer, and had similar optical properties to those of Example 17 despite that the time of the hydrothermal treatment was changed. It was found that stability for the hydrothermal treatment was achieved by moisture permeation resistance and water permeation resistance of the dielectric layer ($SiO_2$ layer).

Example 19

Production of Optical Member

An optical member of Example 19 was produced by the same procedure as that in Example 1 except that the layers were formed by EB deposition (non-continuous).

Example 20

Production of Optical Member

An optical member of Example 20 was produced by the same procedure as that in Example 2 except that the layers were formed by EB deposition (non-continuous).

Example 21

Production of Optical Member

An optical member of Example 21 was produced by the same procedure as that in Example 12 except that the layers were formed by EB deposition (non-continuous).

Example 22

Production of Optical Member

An optical member of Example 22 was produced by the same procedure as that in Example 1 except that aluminum oxide, zirconium oxide, and $SiO_2$ were deposited so that the thickness was 39 nm, 9 nm, and 15 nm, respectively instead of depositing aluminum oxide so that the thickness was 58 nm in Example 1.

Table 11 shows average reflectances of the obtained optical member for light ranging from 380 nm to 780 nm at incident angles of 5 degrees, 12 degrees, 30 degrees, and 45 degrees.

TABLE 11

| Incident angle | Visible light average reflectance (%) |
|---|---|
| 5 degrees | 0.05 |
| 12 degrees | 0.04 |
| 30 degrees | 0.06 |
| 45 degrees | 0.21 |

Table 11 revealed that the average reflectances at incident angles of 5 degrees and 45 degrees were 0.13%, which indicated that the antireflection effect could be widely exerted on incident light coming from front to oblique directions.

Example 23

Production of Optical Member

An optical member of Example 23 was produced by the same procedure as that in Example 22 except that the hydrothermal treatment was carried out in boiling water for 5 minutes instead of 20 seconds in Example 22.

The obtained optical member had optical properties equivalent to those of Example 22. This revealed that stability for the hydrothermal treatment was achieved by moisture permeation resistance and water permeation resistance of the dielectric layer even though an aluminum oxide layer was present as a lower layer.

Example 24

Production of Optical Member

An optical member of Example 24 was produced by the same procedure as that in Example 1 except that $SiO_2$, zirconium oxide, and $SiO_2$ were deposited so that the thickness was 20 nm, 17 nm, and 19 nm, respectively instead of depositing aluminum oxide so that the thickness was 58 nm in Example 1.

Table 12 shows average reflectances of the obtained optical member for light ranging from 380 nm to 780 nm at incident angles of 5 degrees, 12 degrees, 30 degrees, and 45 degrees.

TABLE 12

| Incident angle | Visible light average reflectance (%) |
|---|---|
| 5 degrees | 0.05 |
| 12 degrees | 0.05 |
| 30 degrees | 0.06 |
| 45 degrees | 0.24 |

Table 12 revealed that the average reflectances at incident angles of 5 degrees and 45 degrees were 0.15%, which indicated that the antireflection effect could be widely exerted on incident light coming from front to oblique directions.

Comparative Example 1

Production of Optical Member

An optical member of Comparative Example 1 was produced by the same procedure as that in Example 1 except that the aluminum deposited layer was not formed on the concave meniscus lens.

Comparative Example 2

Production of Optical Member

As Comparative Example 2, an optical member was produced by using a flat glass (material S-TIH6, manufactured by OHARA INC.) as the substrate and replicating Example 2 in JP-B No. 4182236.

Comparative Example 3

Production of Optical Member

As Comparative Example 3, an optical member was produced by using a concave meniscus lens as the substrate and replicating Example 2 in JP-B No. 4182236.

In this lens, there occurred such phenomenon that the thickness is larger in an edge than in a center portion in the convex portion and the reflectance varied depending on portions of the lens. Such phenomenon is described in "the 35th optical symposium lecture manuscripts, p. 67, FIG. 2."

For the obtained lens, average reflectances for light ranging from 380 nm to 780 nm was measured by the same procedure as that in Example 1. As a result, it was revealed that the reflectance at an incident angle of 5 degrees and the reflectance at an incident angle of 45 degrees were significantly different.

Comparative Example 4

Production of Optical Member

An optical member of Comparative Example 4 was produced by the same procedure as that in Example 2 except that $SiO_2$ serving as the dielectric layer was not deposited and only aluminum was deposited so that the thickness was 5 nm.

The obtained optical member did not have a sufficient antireflection effect.

Next, Table 13 shows production conditions and evaluation results in Examples 1 to 24 and Comparative Examples 1 to 4.

<Measurement of Takt Time>

For the vacuum vapor deposition, the time from the moment when the vacuum was broken and a sample was set to the moment when deposition was finished and the sample was taken out was measured. Most of the measured time was waiting time for reaching the targeted vacuum degree. For the hydrothermal treatment, the time from attachment of the sample to a jig to finish of drying of the sample was measured. The results are shown in Table 13-2.

TABLE 13-1

| | | First layer | | Second layer | | Third layer | | Fourth layer | | Formation method |
|---|---|---|---|---|---|---|---|---|---|---|
| | Substrate | Material | Thickness | Material | Thickness | Material | Thickness | Material | Thickness | of layer |
| Ex. 1 | Concave meniscus lens | $Al_2O_3$ | 58 nm | Al | 5 nm | — | — | — | — | EB deposition (continuous) |
| Ex. 2 | Concave meniscus lens | $SiO_2$ | 53 nm | Al | 5 nm | — | — | — | — | EB deposition (continuous) |
| Ex. 3 | Concave meniscus lens | $SiO_2$ | 53 nm | Al | 5 nm | — | — | — | — | EB deposition (continuous) |
| Ex. 4 | Concave meniscus lens | $SiO_2$ | 53 nm | Al | 5 nm | — | — | — | — | EB deposition (continuous) |
| Ex. 5 | Concave meniscus lens | $SiO_2$ | 30 nm | Al | 10 nm | — | — | — | — | EB deposition (continuous) |
| Ex. 6 | Concave meniscus lens | $SiO_2$ | 53 nm | Al | 5 nm | — | — | — | — | EB deposition (continuous) |
| Ex. 7 | Concave meniscus lens | $SiO_2$ | 53 nm | Al | 5 nm | — | — | — | — | EB deposition (continuous) |

TABLE 13-1-continued

|  | Substrate | First layer Material | First layer Thickness | Second layer Material | Second layer Thickness | Third layer Material | Third layer Thickness | Fourth layer Material | Fourth layer Thickness | Formation method of layer |
|---|---|---|---|---|---|---|---|---|---|---|
| Ex. 8 | Concave meniscus lens | $SiO_2$ | 53 nm | Al | 5 nm | — | — | — | — | EB deposition (continuous) |
| Ex. 9 | Concave meniscus lens | $SiO_2$ | 53 nm | Al | 120 nm | — | — | — | — | EB deposition (continuous) |
| Ex. 10 | Concave meniscus lens | $SiO_2$ | 53 nm | $Al_2O_3$ | 160 nm | — | — | — | — | EB deposition (continuous) |
| Ex. 11 | Plastic concave meniscus lens | $SiO_2$ | 30 nm | Al | 10 nm | — | — | — | — | EB deposition (continuous) |
| Ex. 12 | Concave meniscus lens | $SiO_2$ | 24 nm | $TiO_2$ | 16 nm | Al | 5 nm | — | — | EB deposition (continuous) |
| Ex. 13 | Concave lens | $SiO_2$ | 24 nm | $TiO_2$ | 16 nm | Al | 5 nm | — | — | EB deposition (continuous) |
| Ex. 14 | Convex lens | $SiO_2$ | 24 nm | $TiO_2$ | 16 nm | Al | 5 nm | — | — | EB deposition (continuous) |
| Ex. 15 | Concave meniscus lens | $SiO_2$ | 53 nm | $Al_2O_3$ | 5 nm | — | — | — | — | EB deposition (continuous) |
| Ex. 16 | Concave meniscus lens | $SiO_2$ | 24 nm | $TiO_2$ | 16 nm | $Al_2O_3$ | 5 nm | — | — | EB deposition (continuous) |
| Ex. 17 | Concave meniscus lens | $Al_2O_3$ | 60 nm | $SiO_2$ | 30 nm | Al | 15 nm | — | — | EB deposition (continuous) |
| Ex. 18 | Concave meniscus lens | $Al_2O_3$ | 60 nm | $SiO_2$ | 30 nm | Al | 15 nm | — | — | EB deposition (continuous) |
| Ex. 19 | Concave meniscus lens | $Al_2O_3$ | 58 nm | Al | 5 nm | — | — | — | — | EB deposition (non-continuous) |
| Ex. 20 | Concave meniscus lens | $SiO_2$ | 53 nm | Al | 5 nm | — | — | — | — | EB deposition (non-continuous) |
| Ex. 21 | Concave meniscus lens | $SiO_2$ | 24 nm | $TiO_2$ | 16 nm | Al | 5 nm | — | — | EB deposition (non-continuous) |
| Ex. 22 | Concave meniscus lens | $Al_2O_3$ | 39 nm | $ZrO_2$ | 9 nm | $SiO_2$ | 15 nm | Al | 5 nm | EB deposition (continuous) |
| Ex. 23 | Concave meniscus lens | $Al_2O_3$ | 39 nm | $ZrO_2$ | 9 nm | $SiO_2$ | 15 nm | Al | 5 nm | EB deposition (continuous) |
| Ex. 24 | Concave meniscus lens | $SiO_2$ | 20 nm | $ZrO_2$ | 17 nm | $SiO_2$ | 19 nm | Al | 5 nm | EB deposition (continuous) |
| Comp. Ex. 1 | Concave meniscus lens | | | | None | | | | | |
| Comp. Ex. 2 | Flat glass lens | $SiO_2$ | 53 nm | $Al_2O_3$ | 30 nm | — | — | — | — | Liquid phase film forming |
| Comp. Ex. 3 | Concave meniscus lens | $SiO_2$ | 53 nm | $Al_2O_3$ | 30 nm | — | — | — | — | Liquid phase film forming |
| Comp. Ex. 4 | Concave meniscus lens | Al | 5 nm | — | — | — | — | — | — | EB deposition |

TABLE 13-2

|  | Hydrothermal treatment | Concave-convex structure | Height of convex portion | Average reflectance at an incident angle of 5 degrees | Average reflectance at an incident angle of 45 degrees | Average refractive index of outermost layer | Takt time | Number of steps |
|---|---|---|---|---|---|---|---|---|
| Ex. 1 | Immersion in boiling water for 20 sec | Formed | 100 nm | 0.23% | 0.93% | 1.2 | 2 h | 1 |
| Ex. 2 | Immersion in boiling water for 20 sec | Formed | 100 nm | 0.40% | 1.19% | 1.2 | 2 h | 1 |
| Ex. 3 | Immersion in boiling water for 60 min | Formed | 50 nm | 0.90% | 2.56% | 1.2 | 3 h | 1 |
| Ex. 4 | Immersion in boiling water for 5 min | Formed | 100 nm | 0.40% | 1.19% | 1.2 | 2 h | 1 |
| Ex. 5 | Immersion in boiling water for 5 min | Formed | 100 nm | 0.41% | 1.18% | 1.2 | 2 h | 1 |
| Ex. 6 | Immersion for 20 sec at 121° C. and 2 atm using autoclave | Formed | 100 nm | 0.40% | 1.19% | 1.2 | 2 h | 1 |

TABLE 13-2-continued

| | Hydrothermal treatment | Concave-convex structure | Height of convex portion | Average reflectance at an incident angle of 5 degrees | Average reflectance at an incident angle of 45 degrees | Average refractive index of outermost layer | Takt time | Number of steps |
|---|---|---|---|---|---|---|---|---|
| Ex. 7 | Treatment using water vapor of 100° C. for 30 min | Formed | 100 nm | 0.40% | 1.19% | 1.2 | 2 h | 1 |
| Ex. 8 | Immersion in alkaline aqueous solution of 100° C. for 5 min | Formed | 100 nm | 0.39% | 1.14% | 1.2 | 2 h | 1 |
| Ex. 9 | Immersion in boiling water for 10 min | Formed | 100 nm | 0.90% | 3.12% | 1.2 | 2 h | 1 |
| Ex. 10 | Immersion in boiling water for 10 min | Formed | 100 nm | 1.00% | 3.40% | 1.2 | 2 h | 1 |
| Ex. 11 | Immersion in water of 60° C. for 5 min | Formed | 100 nm | 0.40% | 1.60% | 1.2 | 2 h | 1 |
| Ex. 12 | Immersion in boiling water for 20 sec | Formed | 100 nm | 0.21% | 0.90% | 1.2 | 2 h | 1 |
| Ex. 13 | Immersion in boiling water for 20 sec | Formed | 100 nm | 0.20% | 0.88% | 1.2 | 2 h | 1 |
| Ex. 14 | Immersion in boiling water for 20 sec | Formed | 100 nm | 0.22% | 0.92% | 1.2 | 2 h | 1 |
| Ex. 15 | Immersion in boiling water for 20 sec | Formed | 100 nm | 0.42% | 1.23% | 1.2 | 2 h | 1 |
| Ex. 16 | Immersion in boiling water for 20 sec | Formed | 100 nm | 0.23% | 0.93% | 1.2 | 2 h | 1 |
| Ex. 17 | Immersion in boiling water for 1 min | Formed | 100 nm | 0.22% | 0.34% | 1.2 | 2 h | 1 |
| Ex. 18 | Immersion in boiling water for 5 min | Formed | 100 nm | 0.22% | 0.34% | 1.2 | 2 h | 1 |
| Ex. 19 | Immersion in boiling water for 20 sec | Formed | 100 nm | 0.23% | 0.93% | 1.2 | 4 h | 2 |
| Ex. 20 | Immersion in boiling water for 20 sec | Formed | 100 nm | 0.40% | 1.19% | 1.2 | 4 h | 2 |
| Ex. 21 | Immersion in boiling water for 20 sec | Formed | 100 nm | 0.21% | 0.90% | 1.2 | 6 h | 3 |
| Ex. 22 | Immersion in boiling water for 20 sec | Formed | 100 nm | 0.05% | 0.21% | 1.2 | 2 h | 1 |
| Ex. 23 | Immersion in boiling water for 5 min | Formed | 100 nm | 0.05% | 0.21% | 1.2 | 2 h | 1 |
| Ex. 24 | Immersion in boiling water for 20 sec | Formed | 100 nm | 0.05% | 0.24% | 1.2 | 2 h | 1 |
| Comp. Ex. 1 | None | Not formed | None | 15.09% | 17.10% | — | | |
| Comp. Ex. 2 | Immersion in hot water of 60° C. for 15 min and then heat treatment at 400° C. for 30 min | Formed | 100 nm | 0.50% | 1.30% | 1.2 | 4 h | 2 |
| Comp. Ex. 3 | Immersion in hot water of 60° C. for 15 min and then heat treatment at 400° C. for 30 min | Formed | 100 nm | 1.20% | 3.20% | 1.2 | 4 h | 2 |

TABLE 13-2-continued

|  | Hydrothermal treatment | Concave-convex structure | Height of convex portion | Average reflectance at an incident angle of 5 degrees | Average reflectance at an incident angle of 45 degrees | Average refractive index of outermost layer | Takt time | Number of steps |
|---|---|---|---|---|---|---|---|---|
| Comp. Ex. 4 | Immersion in boiling water for 20 sec | Formed | 100 nm | 7.57% | 11.82% | 1.2 | 2 h | 1 |

INDUSTRIAL APPLICABILITY

The optical member of the present invention is suitably used for glass spectacles, camera lenses, optical lenses, solar battery panels, cathode-ray tubes, filters, word processors, computers, liquid crystal televisions, displays such as plasma display panels, polarization plates used for liquid crystal display devices, finder lenses for cameras, prisms, fly-eye lenses, toric lenses, covers for various measuring gauges, windows of automobiles and trains, lenses for projectors, micro lenses for optical sensors, or the like.

The aspects of the present invention are as follows.

<1> An optical member, including:
a substrate having an at least partially curved surface;
a concave-convex structure at an outermost surface, the concave-convex structure being prepared by hydrothermal treatment of a layer formed by gas-phase deposition of at least one of simple aluminum and a compound containing aluminum on the substrate; and
a dielectric layer formed by gas-phase deposition between the substrate and the concave-convex structure.

<2> The optical member according to <1>,
wherein the layer formed by gas-phase deposition of at least one of simple aluminum and a compound containing aluminum is composed of at least one of aluminum and alumina.

<3> The optical member according to <1> or <2>,
wherein the hydrothermal treatment is an immersion treatment into hot water having a temperature of 60° C. or more but a boiling point thereof or less, or an alkaline aqueous solution having a temperature of 60° C. or more but a boiling point thereof or less.

<4> The optical member according to <1> or <2>,
wherein the hydrothermal treatment is an exposure treatment to water vapor.

<5> The optical member according to any one of <1> to <4>,
wherein an average height of a convex portion of the concave-convex structure is 5 nm to 1,000 nm.

<6> The optical member according to any one of <2> to <5>,
wherein an average thickness of the outermost layer composed of aluminum formed by gas-phase deposition is 100 nm or less before the hydrothermal treatment.

<7> The optical member according to any one of <2> to <5>,
wherein an average thickness of the outermost layer composed of alumina formed by gas-phase deposition is 150 nm or less before the hydrothermal treatment.

<8> The optical member according to any one of <1> to <7>,
wherein the dielectric layer is a dielectric multiple layer including two or more layers.

<9> The optical member according to any one of <1> to <8>,
wherein the substrate is a lens having a curvature.

<10> A method for producing an optical member, including:
forming a dielectric layer on a substrate having an at least partially curved surface by gas-phase deposition;
forming an outermost layer on the dielectric layer by gas-phase deposition of at least one of simple aluminum and a compound containing aluminum; and
forming a concave-convex structure by hydrothermal treatment of the outermost layer.

<11> The method for producing an optical member according to <10>,
wherein the gas-phase deposition in the forming of the dielectric layer and the forming of the outermost layer is continuously carried out with maintaining a vacuum state.

What is claimed is:

1. A method for producing an optical member, the method consisting of:
   forming a dielectric layer on a lens having a curvature by gas-phase deposition;
   forming an outermost layer on the dielectric layer by gas-phase deposition of simple aluminum; and
   forming a concave-convex structure by hydrothermal treatment of the outermost layer,
   wherein said hydrothermal treatment is one selected from the group consisting of (a) immersing in hot water having a temperature in a range of from 60° C. to a boiling point of the water, for a time period of 10 seconds to 5 minutes, (b) immersing into an alkaline aqueous solution having a temperature in a range of from 60° C. to a boiling point of the alkaline aqueous solution, for a time period of 10 seconds to 10 minutes, and (c) exposing to water vapor for a time period of 1 minute to 24 hours.

2. The method for producing an optical member according to claim 1,
   wherein the gas-phase deposition in the forming of the dielectric layer and the forming of the outermost layer is continuously carried out with maintaining a vacuum state.

* * * * *